Patented Sept. 16, 1924.

1,508,901

UNITED STATES PATENT OFFICE.

WILLIAM STOCKS, OF MIRAMAR, NEAR WELLINGTON, NEW ZEALAND.

METHOD OF TREATING VULCANIZED RUBBER AND OF MIXING SAME, ETC.

No Drawing.     Application filed October 21, 1920.  Serial No. 418,562.

*To all whom it may concern:*

Be it known that I, WILLIAM STOCKS, a subject of the King of Great Britain, residing at Miramar, near Wellington, in the Dominion of New Zealand, have invented new and useful Improvements in the method of treating vulcanized rubber and of mixing same with virgin rubber for the purpose of manufacturing a new improved commercial rubber dough for the manufacture of all classes of goods where rubber is required, of which the following is a specification.

This invention is an improvement upon the invention described in the specification of my co-pending application for Letters Patent of the United States of America Serial No. 261,734, filed 8th November, 1918.

In carrying out my invention, I first employ a pair of heavy revolving rollers heated to a temperature exceeding that at which the rubber was subjected during the vulcanizing thereof. On these rollers, I place any proportion of rubber that has previously been vulcanized and masticate the said rubber with these heated rollers, and while the rubber is being masticated underheat the sulphur is simultaneously driven out in the form of a vapour due to the heating of the masticating rollers the amount of the vulcanizing agent given off depending upon the time of treatment and degree of heat. In this condition the material is in a comminuted state with the rubber and sulphur in a separated condition.

When the rubber has been sufficiently masticated to render it into a comminuted and plastic state, it is removed from the highly heated rollers and forms a stock rubber to be known as devulcanized rubber.

I next employ a pair of the ordinary mixing rollers known to the rubber manufacturing trade heated and place on these rollers a portion of virgin rubber such as Pará rubber or the like. The revolving action of the rollers causes the virgin rubber to be thoroughly masticated into a plastic mass.

To this I add any required proportion of my devulcanized rubber prepared as herein previously described. By the revolving action of the heated rollers, the two rubbers are thoroughly mixed into a homogeneous mass of a plastic nature forming a stock to be known as my new and improved rubber dough, which I then remove from the rollers.

This stock can be used for the manufacture of the best rubber goods of every description.

I next take a portion of this rubber dough manufactured as herein previously described and place same again on the ordinary heated mixing rollers and add sulphur with or without litharge, zinc oxide and the like in sufficient quantities to produce vulcanization when later subjected to heat. Through the action of the rollers, the compound is thoroughly mixed through the said rubber dough. I then remove the resulting compound from the rollers. This is to be known as my new and improved rubber dough compounded.

This dough compound can be rolled into sheets into any desired thickness or moulded into any desired goods such as motor tubes, motor tyres, and all classes of rubber goods and vulcanized by subjecting to heat as well known to the rubber trade.

For the manufacture of articles other than pure rubber goods, I use suitable proportions of rubber dough not compounded or compounded for vulcanization whether manufactured as herein previously described or in the ordinary way well known to the rubber trade, together with any suitable proportion of any ground or disintegrated vegetable fibrous materials, preferably cotton such as motor tyre fabrics or the like. The rubber dough and the ground or disintegrated fibrous materials are thoroughly mixed together by the action of the revolving rollers of any ordinary mixing machine.

It must be understood that the proportions of rubber dough and fibrous materials vary in accordance with the class of articles required to be produced.

When the rubber dough and fibrous materials are thoroughly mixed together the mixture is rolled into sheets of any required thickness, widths or lengths. The first grade material to take the place of leather for boot soles, being durable and impervious to water. The second grade material to be used in place of leather for bags, and portmanteaux, being strong, flexible and impervious to water, and capable of being embossed with any required design.

The third grade material to be used in place of leather for the building up of boot heels.

The fourth grade material is to be used for floor coverings in place of linoleums and the like. This can be manufactured in many grades.

The fifth quality material to be used for wall tiles, floor tiles, roof tiles, electric switchboards and the like. These materials being vulcanized hard whilst held by an hydraulic press.

What I do claim is:

1. A new and improved method of treating vulcanized rubber consisting essentially in the simultaneous masticating and heating of vulcanized rubber at a temperature exceeding that at which the vulcanized rubber has previously been vulcanized by heavy revolving rollers in a heated condition, substantially as and for the purposes set forth 2. A new and improved composition of matter consisting essentially of the blending together of virgin rubber and a product produced from old vulcanized rubber by simultaneously masticating and heating the same to a temperature exceeding that at which it was vulcanized by rolling said product and the virgin rubber into a plastic mass.

3. A new and improved composition of matter consisting of the blending together of virgin rubber and a product produced by simultaneously masticating and heating vulcanized rubber at a temperature exceeding that at which it was vulcanized by rolling said product and the virgin rubber into a plastic mass, and then blending sulphur with or without litharge, zinc oxide and the like therewith by rolling said ingredients into a plastic mass.

4. A new article of manufacture consisting of vulcanized rubber reduced to a comminuted state with the rubber and vulcanizing agent in a partially separated condition.

In testimony whereof I affix my signature in presence of two witnesses.

WILLIAM STOCKS.

Witnesses:
HELEN STOCKS,
J. C. STODDARD.